Patented Dec. 16, 1930

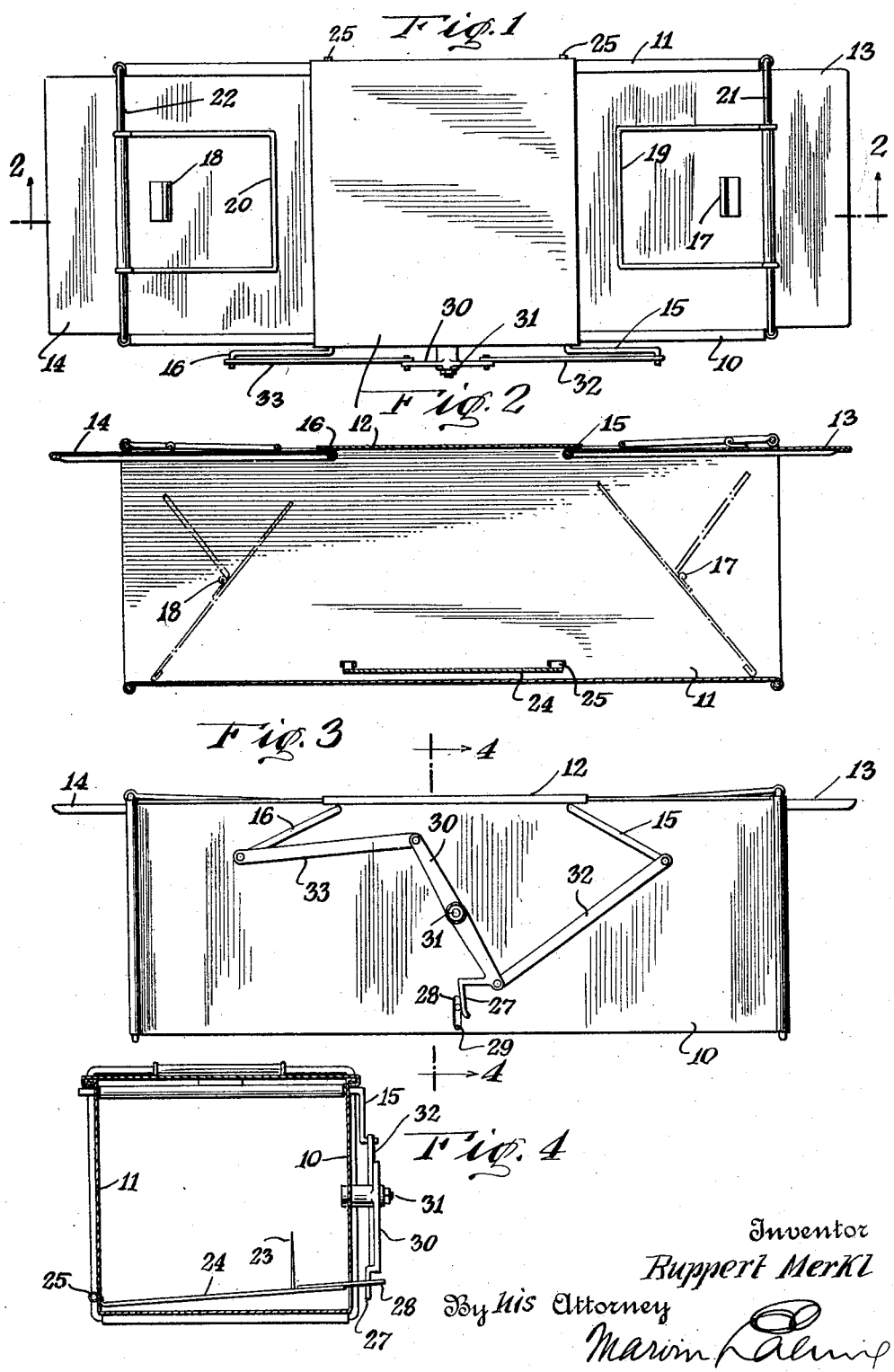

1,784,904

UNITED STATES PATENT OFFICE

RUPPERT MERKL, OF OSSINING, NEW YORK

RODENT TRAP

Application filed March 25, 1930. Serial No. 438,715.

This invention relates to improvements in traps, particularly to a rodent trap for catching mice, rats or the like animals, and it is the principal object of my invention to provide a trap, the end doors of which are kept open while the trap is set and are closed by the operation of a trap springing mechanism by the animal if the same depresses a movable platform when trying to reach the bait.

Another object of my invention is the provision of a mouse trap of simple and inexpensive construction, yet durable and efficient in operation.

A further object of my invention is the provision of a trap of this type, the doors of which are equipped with means for keeping the same closed when the trap has been sprung by an animal caught therein.

A still further object of my invention is the provision of a rodent trap equipped with a suitable lever mechanism including a trigger adapted to normally keep the platform carrying the bait raised and the doors open.

These and other objects and advantages of my invention will become more fully known as the description thereof proceeds, and will then be more specifically defined in the appended claims.

In the accompanying drawing forming a material part of this disclosure:

Fig. 1 is a top plan view of a trap constructed according to my invention, set.

Fig. 2 is a longitudinal section through the same on line 2—2 of Figure 1.

Fig. 3 is a front elevation of the trap.

Fig. 4 is a cross-section on line 4—4 of Figure 3.

As illustrated, the trap consists of a casing composed of the two parallel side walls 10, 11, central stationary cover part 12, and movable end walls 13 and 14.

The inner ends of the end walls are hingedly secured to cross-rods 15, 16, and carry in approximately the center of their outer faces stops 17, 18, for engagement by the end bars 19, 20, of frames, the ends of the side bars of which are turnably attached to cross-bars or rods 21, 22, holding the trap end doors in their trap closing position after the trap has been sprung by an animal nibbling on the bait empaled on the sharp pointed stake 23.

In order to reach the bait the animal must step on a platform 24 which is movably secured, as at 25, at one end in the end wall 11 near the bottom 26 of the trap on the other side of which the stake 23 is erected. The animal depresses the platform 24 and operates the trap springing mechanism, the trigger 27 of which engages a lever 28 projecting from the end of platform 24 through an opening 29 in the front wall 10.

The trap setting and spring mechanism including its trigger 27 comprises a lever 30 pivotally secured in its middle by a pin 31 projecting from the front wall 10 of the trap.

To the lower end of lever 30 is attached the rearwardly extending trigger 27 held in engagement with the lever 28 by means of the arms 32, 33, pivotally secured at their inner ends to the lower and upper end of lever 30 respectively.

To the outer ends of arms 32, 33, are pivotally attached the outer angularly bent ends of the rods 15, 16 to which the inner ends of end walls or doors 13, 14 are hinged to keep the same elevated when the trap is set and allowing free access to the trap with the frames 19, 20 resting idly on top of the doors.

The operation of my trap will be entirely clear from the disclosure and it will be evident that when setting the trap the bait is impaled on stake 23, the front end of the platform 24 is raised by means of its lever 28 and the same is engaged by the tripper 27 as shown in Figure 3 to keep the platform in its elevated position, with the doors in horizontal position.

If now the animal, in order to reach the bait, steps on the platform 24 its weight will depress the same and disengage its lever 28 from the trigger so that now the doors will close under their own weight, and will be kept closed by the engagement of bars 19 and 20 with the stops 17, 18 so that the animal cannot escape.

It will be understood that lever 30 as well as arms 32, 33 and rods 15, 16 can be made of strong spring wire and that I may make such other changes in the combination of the trap as come within the scope of the appended claims without departure from my invention.

Having thus described my invention what I claim as new and desire to secure by Letters Patent is:

1. A rodent trap comprising a housing, doors for closing the ends of said housing, cross-rods to which the inner ends of said doors are hinged, angularly bent ends on said rods, frames turnably attached to said cross-rods, a movable platform in said housing, a stake on said platform for impaling the bait, a system of levers connected to said angularly bent rod ends, a lever extending from said platform through the wall of said housing, a trigger combined with said system of levers, engaging said lever to keep the platform elevated with the doors open, said platform adapted to be depressed by an animal stepping on the same desiring to reach the bait to disengage said trigger from said lever and allowing said system of levers to close the end doors and stops on said doors adapted to be engaged by the end bars of said frames for keeping the doors closed for barring the escape of the trapped animal.

2. In animal traps including a box, a movable platform therein, and end doors for said box, a means for closing the doors by an animal stepping on said movable platform, said means comprising a lever pivotally secured in its center to a pin projecting from the box, a rearwardly extending trigger at the lower end of said lever, an arm on said platform engaged by said trigger extending from said box, arms pivotally attached at their inner ends to the ends of said pivoted lever, rods to which the doors are hinged having outer angularly bent ends pivotally attached to the ends of said arms for closing the doors upon the depression of said movable platform, a pair of stops on said doors and frames turnably attached to said rods adapted to engage said stops upon the closure of said door to prevent the escape of the animal.

In witness whereof I have signed my name to this specification.

RUPPERT MERKL.